United States Patent Office 2,975,031
Patented Mar. 14, 1961

2,975,031
PREPARATION OF CYANAMIDE

William R. Rolingson, Texas City, Tex., assignor to Monsanto Chemical Company, St. Louis, Mo., a corporation of Delaware No Drawing. Filed Nov. 6, 1958, Ser. No. 772,187

4 Claims. (Cl. 23—190)

The present invention relates to the preparation of cyanamide.

It has now been determined that cyanamide can be prepared by heating hydrocyanic acid at elevated temperatures in the presence of an inorganic, heat-stable adsorbent of high surface area such as activated alumina, for example. The cyanamide is formed on the surface of the adsorbent catalyst from which it may be recovered by conventional techniques such as leaching with water or any of the known cyanamide solvents.

The following examples illustrate the invention but are not to be construed as limiting it in any manner whatsoever.

Example 1

A quartz tube about 30 in. long and approximately 1 in. in diameter was employed as a reactor. A bed of catalyst consisting of activated alumina in pellet form about 2 in. in depth (15 g.) was supported within the reactor on a circular porous quartz plate located at about the midpoint of the tube. The reactor was heated by means of resistance wire wrapping covered by the necessary insulation. Temperatures in the tube and catalyst bed were recorded by means of a sliding iron-constantan thermocouple inserted in a quartz thermowell which extended through the catalyst bed.

Gaseous hydrogen cyanide was fed through a flowmeter at a rate of about 0.8 mole per hour then passed into the reactor and through the catalyst bed which was heated to a temperature of about 600° C. Pressure in the reactor was maintained at essentially atmospheric. Total reaction time was about 30 min. At the end of this time, the reactor was cooled and the catalyst was removed and slurried in hot water to extract any cyanamide formed as an aqueous solution. The slurry was filtered and the pH of the filtrate was adjusted to about 4.0 by the addition of nitric acid. Aqueous silver nitrate was added to the filtrate to precipitate any cyanides present. The mixture was then filtered to remove the small amount of precipitate formed. The pH of the filtrate was adjusted to 8.0 by the dropwise addition of ammonium hydroxide and silver cyanamide was precipitated from the solution as a bright yellow solid indicating that the reaction product deposited on the catalyst was cyanamide. This mixture was filtered to recover the precipitate which was washed with distilled water and dried. The recovered silver cyanamide was subjected to infrared analysis and positively identified as this compound by comparison of its infrared spectrum with that of a known sample of silver cyanamide.

Example 2

The experiment of Example 1 was repeated at a temperature of 700° C. and a flow rate of 0.33 mole per hr. The reaction product was recovered from the catalyst as described in Example 1. A precipitate of silver cyanamide was again obtained and positively identified by infrared analysis demonstrating that cyanamide had been deposited on the catalyst during the reaction.

Example 3

Another experiment was conducted in which HCN was passed over the alumina catalyst as in the previous examples at a rate of 0.33 mole per hr. for 0.5 hr., the catalyst being maintained at a temperature of about 950° C. The conversion of HCN to cyanamide was conclusively established by recovery of this compound as the silver salt after leaching of the catalyst with water and treating the solution obtained as described in the above examples.

Example 4

The catalyst bed in this run consisted of activated silica gel. It was heated to a temperature of about 750° C. and maintained at that level while nitrogen was passed over it for approximately one-half hour. HCN was then passed through the catalyst bed at a rate of 0.3 mole per hour for about one-half hour. The catalyst was treated as in the preceding examples and a quantity of silver cyanamide roughly equal to that obtained in Example 3 was recovered establishing that cyanamide had been formed from the HCN and deposited on the catalyst.

The invention is not to be considered as limited to the specific conditions set forth in the examples. In addition to alumina and silica for example, any inorganic substance that provides a high surface area may be employed as the catalyst. Among such materials are celite, kieselguhr, pumice, fuller's earth, and the like.

The temperature of the reaction may vary over a wide range. Trace amounts of cyanamide can be obtained at temperatures as low as 400° C. but the preferred temperature range for practical operation is from about 575° C. to about 800° C. The upper limit of the temperature range is dependent only upon the stability of the catalyst. Temperatures up to 1000° C. and higher may be used but these tend generally to cause disintegration of the catalyst.

While the examples represent operation at atmospheric pressure, the process may be conducted at superatmospheric pressures if desired.

Either a batch or continuous process is feasible. Other conditions being equal, the yield of cyanamide varies with the reaction time in a fixed bed catalyst and is proportional to the weight of the catalyst. As the cyanamide forms and deposits on the catalyst, the catalyst decreases in activity. The most practical type of operation from a commercial standpoint, therefore, appears to be a moving-bed type of catalyst or the use of a so-called fluidized catalyst technique. The product cyanamide may be readily recovered from the surface of the catalyst by leaching with water as described or by other means well known to those skilled in the art.

What is claimed is:

1. The process of preparing cyanamide which comprises heating hydrogen cyanide in the presence of an inorganic material of high surface area chosen from the group consisting of alumina, silica gel, celite, kieselguhr, pumice, and fuller's earth to a temperature in the range from about 575° C. to about 1000° C.

2. The process of preparing cyanamide which comprises heating hydrogen cyanide in contact with an inorganic material of high surface area chosen from the group consisting of alumina, silica gel, celite, kieselguhr, pumice, and fuller's earth to a temperature in the range from about 600° C. to about 950° C.

3. The process of claim 2 wherein the inorganic material of high surface area is alumina.

4. The process of claim 2 wherein the inorganic material of high surface area is silica.

References Cited in the file of this patent

UNITED STATES PATENTS 2,835,556    Boatright et al. _____ May 20, 1958